Patented June 17, 1952

2,600,382

UNITED STATES PATENT OFFICE 2,600,382

VINYL STEARATE ALLYL LAURATE COPOLYMER

La Verne N. Bauer and William L. Van Horne, Philadelphia, and Harry T. Neher, Bristol, Pa., assignors to Rohm & Haas Company, Philadelphia, Pa., a corporation of Delaware No Drawing. Application July 15, 1949, Serial No. 105,041

1 Claim. (Cl. 260—85.7)

This invention relates to copolymers of (A) vinyl esters of saturated, aliphatic, monocarboxylic acids of at least sixteen carbon atoms and (B) esters from allyl and/or methallyl alcohol and saturated, aliphatic, monocarboxylic acids of three to twelve carbon atoms. It also deals with compositions of matter comprising wax-containing hydrocarbon liquids having dissolved therein one of said copolymers. This invention is particularly directed to waxy lubricating oils containing a said copolymer in an amount sufficient to depress the pour point thereof.

Various proposals have been made to dissolve resinous materials in oils. Such resinous solutions have viscosities greater than those of an oil by itself. In some instances, a thus thickened oil has less change in viscosity with temperature than the oil by itself. In some cases, the solution of resinous material raises the pour point of the oil used as solvent; in others it has no effect; and in still others it may lower the pour point. This last effect is not predictable on the basis of present day art.

We have observed that polymers of vinyl stearate, vinyl palmitate, vinyl octoate, vinyl butyrate, allyl stearate, methallyl laurate, allyl octoate, or allyl nonoate do not lower the pour point of oils or other hydrocarbon fluids having waxy pour points when such polymers are dissolved therein either singly or in mixtures. In contrast to this situation we now find that certain copolymers prepared from mixtures of vinyl esters of long-chained monocarboxylic acids and allyl esters of smaller chained monocarboxylic acids have a definite value in lowering the pour point of wax-containing oils or other hydrocarbon fluids. The required copolymers are formed from (A) vinyl ester of aliphatic monocarboxylic acids of sixteen to twenty-four carbon atoms and (B) esters of allyl and/or methallyl alcohol and aliphatic monocarboxylic acids of three to twelve carbon atoms, the proportions of ester A to ester B entering into the copolymer varying from two of ester A to one of ester B to one of ester A to a number of moles of ester B which is equal to the number of carbon atoms in the acid portion thereof minus two.

Thus, suitable copolymers are prepared by taking one mole of a vinyl ester such as vinyl palmitate, vinyl margarate, vinyl stearate, vinyl tricosanoate, or vinyl tetracosanoate and at least one half mole of allyl or methallyl propionate, butyrate, isobutyrate, valerate, hexoate, heptoate, isoheptoate, octoate, isooctoate, 2-ethylhexoate, isononoate, 3,5,5-trimethylhexoate, undecanoate, or laurate. The largest proportion of allyl or methallyl esters which may be taken in general depends on the number of carbon atoms in the longest chain of the carboxylic acid used to form these esters. While a half mole to one mole of allyl propionate per mole of vinyl stearate, for example, gives a satisfactory copolymer for use as a pour point depressant, as many as two moles of allyl butyrate or three moles of allyl valerate, or four moles of allyl hexoate, or six moles of allyl octoate may be taken. When the carboxylic acid has a branched chain, the proportion of carboxylic acid which is useful depends on the longest chain. For example, in the case of allyl 2-ethylhexoate the top proportion is about four moles per mole of vinyl ester. This limit of the number of carbon atoms in the acid chain minus two holds very well except for the laurate, in which case somewhat more allyl laurate or methallyl laurate may be copolymerized than would be predicted from a strict application of the rule. Experience indicates that the lower limit generally holds, although below this limit some combinations have been found having some pour depressing action.

In preparation of allylic esters it is found that allyl groups and methallyl groups are essentially interchangeable. The $\alpha$-methyl group of the latter may impart some advantage through increased oil-solubility. Other $\alpha$-groups or groups in the $\beta$-position behave quite differently and the esters from corresponding alcohols fail to give copolymers having the economic effectiveness of the copolymers of this invention.

The monomeric allyl or methallyl esters are those from saturated, aliphatic, monocarboxylic acids, RCOOH, where R is an alkyl group of two to eleven carbon atoms. This alkyl group may be of straight or branched structure. These esters are available through known methods of esterification. Direct esterification of alcohol and acid may be used with removal of water with the aid of a solvent such as benzene or toluene. Acid anhydrides when available may be used. Other methods include use of acid halides and interchange reactions. The latter are of particular interest for preparing methallyl esters. While individual allyl esters may be prepared and used, mixtures of these esters may similarly be taken for copolymerization with the vinyl esters. Limiting proportions are then determined by the average chain length minus two.

The vinyl esters are available through known procedures, such as the reaction of acetylene with a carboxylic acid in the presence of a zinc catalyst. Interchange of a large acid chain for a smaller is also feasible. The vinyl esters may be prepared as single pure esters of the individual monocarboxylic acids of sixteen to twenty-four carbon atoms or esters of mixed higher fatty acids may be prepared. Thus, commercial mixtures of palmitic and stearic or other mixtures of acids may be used.

In the preparation of the copolymers of this invention, it is necessary that conditions be chosen to ensure copolymerization, since the individual polymers are not effective as pour point depressants. The mixture of vinyl monomer and allyl monomer is copolymerized in an inert organic solvent, such as benzene, toluene, xylene, a petroleum naphtha, or the like in the presence of an organic peroxide in a concentration from 2.5% to about 12% or more. A range of 3% to 6% at the start is to be preferred and a peroxide catalyst is added in small increments from time to time during the copolymerization. Solvent may also be added from time to time as sufficient solvent must at all times be present to ensure homogeneity of the solution containing the copolymer.

Temperature of copolymerization varies from about 75° C. to 150° C. One temperature range may be used at the start and another as copolymerization proceeds. Optimum temperatures depend on solvent selected, concentration of monomers therein, the catalyst selected, and time. These variables should be fixed with reference to the intended molecular size of copolymer and with regard for maintaining the copolymer in an oil-soluble form. Observance of the conditions here discussed generally ensures a soluble product. If gelation should occur through failure to adhere to these conditions, it is best to discard the product. Under the prescribed conditions soluble products are produced having apparent molecular weights from about 500 to about 20,000.

Suitable catalysts for effecting the desired copolymerization are organic peroxides. A single peroxide or several peroxides may be added to the solvent solution of the vinyl ester and allylic ester within defined proportions. Suitable peroxides include acetyl peroxide, caproyl peroxide, lauroyl peroxide, benzoyl peroxide, dibenzoyl peroxide, di-tert.-butyl diperphthalate, tert.-butyl perbenzoate, 2,2 - bis(tert. - butylperoxy)butane, methyl ethyl ketone peroxide, di-tert.-butyl peroxide, and tert.-butylhydroperoxide.

Typical methods for preparing the copolymers of this invention follow.

Example 1

There were mixed 25 parts by weight of toluene, 5 parts by weight of benzoyl peroxide, 29.5 parts of methallyl propionate, and 70.5 parts of vinyl stearate. The mixture was slowly added to a reaction vessel which was swept out with nitrogen and equipped with a stirrer and heated to 100° C. to 105° C. After 2.67 hours 2 parts of benzoyl peroxide was added and the temperature maintained at 100° C. After another two hours 5 parts of benzoyl peroxide was added. After another 1.67 hours another two parts of benzoyl peroxide was added. After about six hours of copolymerization 30 parts of toluene was added and shortly thereafter 0.8 part of benzoyl peroxide. The temperature then was advanced to about 108° C. After a total of 7.5 hours 120 parts of toluene was added. When the solution had been stirred until homogeneous, heating was discontinued. The batch amounted to a total of 273 parts. Analysis by evaporation at 150° C. showed a non-volatile content of 35.3%, representing a copolymer yield of 96.5%. The viscosity of a 30% solution in toluene was 5 cs. at 100° F.

Example 2

A mixture was prepared from 25 parts by weight of toluene, 2.5 parts of benzoyl peroxide, 25 parts of vinyl palmitate, and 25 parts of allyl 3,5,5-trimethylhexoate. This mixture was slowly added to a reaction vessel which was swept with nitrogen and which was maintained with stirring between 103° C. and 113° C., a period of 1.7 hours being taken to complete this addition. The mixture was stirred for another hour and then 1 part of benzoyl peroxide in 10 parts of toluene was added and the mixture held at 108° C. for 1.8 hours. The temperature was then allowed to drop to 103° C. and 2.5 parts of benzoyl peroxide in 20 parts of toluene added. After another hour one part of benzoyl peroxide in 15 parts of toluene was added and the temperature then held at 100° C. After a total of 6.5 hours a 0.4 part portion of benzoyl peroxide was added and after 8.5 hours the solution of copolymer was extended with 86 parts of toluene. At the end of eight hours heating was discontinued.

The copolymer solution thus obtained contained 32% of non-volatile product. Adjusted to 30% solids content in toluene it had a viscosity of 3.9 cs. at 100° F.

A portion of the toluene solution of the above copolymer was mixed with a light lubricating oil. The mixture was heated under reduced pressure, a temperature of 140° C. being reached at a pressure of 2 mm. The resulting oil solution contained 38.6% of copolymer and was a useful and suitable concentrate of the copolymer for addition to petroleum oils having a waxy pour point, in which the copolymer is effective as a pour point depressant.

Example 3

A mixture was prepared from 10 parts of toluene, 5 parts of benzoyl peroxide, 35 parts of vinyl palmitate and 65 parts of methallyl laurate. This mixture was copolymerized by the procedure shown in the above examples. It was slowly run into a reaction vessel which was swept out with nitrogen and which was maintained at 107° C. to 112° C. After 2.6 hours 2 parts of benzoyl peroxide in 35 parts of toluene was added. After 4.5 hours 5 parts of benzoyl peroxide in 50 parts of toluene was added and the temperature allowed to fall to 102° C., at which temperature level it was maintained for two hours. During this time 2 parts of benzoyl peroxide in 30 parts of toluene was run in. After a total time of 6.5 hours 0.8 part of benzoyl peroxide was added and the temperature then maintained at 100° C. After 7.5 hours 68 parts of toluene was added. Stirring was continued for a half hour with the temperature held at 100° C. after which time heating was discontinued.

The product was a 36.3% solution of copolymer in toluene, the yield of copolymer being 92.4%. A portion of this solution, adjusted to 30% copolymer in toluene, had a viscosity of 3.49 cs. at 100° F.

The above preparation repeated with use of lauroyl peroxide in place of the benzoyl peroxide likewise gave a useful copolymer. The lauroyl peroxide was used in an amount of 8 parts at the start with addition of 16 parts during copolymerization. The yield was 89% based on the monomers and the copolymer imparted to a 30% toluene solution a viscosity of 2.6 cs. at 100° F.

*Example 4*

A mixture was prepared from 10 parts by weight of toluene, 1.25 parts of benzoyl peroxide, 6.7 parts of allyl propionate and 18.3 parts of vinyl stearate. This mixture was placed in a reaction vessel and stirred by passage of nitrogen gas therethrough. The reaction vessel was heated in an oil bath to 110° C. After three hours 0.5 parts of benzoyl peroxide was added and heating was continued at 118° C. for 1.75 hours. An addition of 1.25 parts of benzoyl peroxide was then made and the reaction mixture heated at 110° C. for one hour, whereupon 0.5 part of benzoyl peroxide was added and heating continued at 103° C. for an hour. An addition of 0.2 parts of benzoyl peroxide was made and the temperature raised to 111° C. for an hour, after which time the batch was allowed to cool. A 100% yield of copolymer was obtained in a 69.7% solution.

The copolymer was transferred to a light lubricating oil by mixing the toluene solution therewith and heating under reduced pressure. The final temperature was 140° C./1 mm.

In the same way vinyl tetracosanate is mixed with allyl butyrate in a molecular ratio of one to 1.9 and a copolymer formed therefrom in solvent solution. This copolymer like all of the above is an effective pour point depressant in wax-containing hydrocarbon liquids.

*Example 5*

There were mixed 17.5 parts of vinyl stearate and 32.5 parts of methallyl laurate. Thereto was added a solution of 2.5 parts of benzoyl peroxide in 10 parts of toluene. Copolymerization was started at 105° C. and later continued at 97° C. to 101° C. During the course of copolymerization 6.9 parts of benzoyl peroxide and 95 parts of toluene were added in small portions. The total time of polymerization was 8 hours. The product was a 26.8% solution of copolymer, corresponding to a yield of 92.2% based on the monomers.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97—47). In some instances, this test was supplemented or replaced with shock chilling and/or maximum pour tests. Cf. Proc. A. S. T. M. 45, Appendix I, p. 244 (1945). The shock chilling determination is made by observing the sample during the initial cooling step with the cooling jacket at −60° F.

The useful range for using the copolymers of this invention in hydrocarbon fluids is from a concentration of about 0.05% up to about 2%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (Oil I). This was an oil which proved to be relatively sensitive to the action of pour point depressants. The second oil (Oil II) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F. A third oil (Oil III) was a 500 Mid-Continent solvent-extracted neutral (S. A. E. 30) having a pour point of +25° F. This was known to be an oil which was not readily changed as to its pour point.

A copolymer prepared from one mole of vinyl stearate and one mole of allyl propionate was dissolved in Oil I at 0.5%. The resulting solution had a pour point of −10° F. At 0.1% of copolymer the pour point was 0° F. At 0.04% in Oil II the pour point was +20° F. A copolymer from one mole of vinyl stearate and three moles of allyl propionate gave a pour point at 0.04% in Oil II of +30° F.

A copolymer from one mole of vinyl stearate and 0.6 moles of allyl butyrate gave a pour point in Oil I at 0.5% or 0.25% of −10° F. Another copolymer based on one mole of vinyl stearate and one mole of allyl butyrate gave a pour in Oil I at 0.5% of −15° F., at 0.25% of −10° F., and at 0.1% of 0° F. In Oil II at 0.1% it gave a pour point of +10° F. In Oil III at 0.5% it gave an A. S. T. M. pour point of −5° F. and a pour point by shock chilling of +5° F. A copolymer from one mole of vinyl stearate and 1.5 moles of allyl butyrate gave pour points in Oil I at 0.5% and 0.25% of −10° F. and in Oil II at 0.04% of +10° F. In Oil III at 0.5% the pour point by shock chilling was −5° F. A copolymer from one mole of vinyl stearate and two moles of allyl butyrate gave pour points of −5° F. at 0.5% and 0.25% in Oil I and of −10° F. at 0.5% in Oil III. A copolymer from vinyl stearate and allyl butyrate in a molar ratio of 1 to 2.5 gave a pour point at 0.5% in Oil I of +30° F.

A copolymer from vinyl stearate and allyl isobutyrate in a molar ratio of 1 to 1 gave pour points of −5° F. at 0.5% and 0.25% in Oil I and −5° F. at 0.5% in Oil III.

A copolymer was prepared from a mixture of vinyl stearate and allyl 3,5,5-trimethylhexoate in a 1:1.425 mole ratio. In Oil I at 0.5% it depressed the pour point to −20° F. In Oil III at 0.5% it gave a pour point of 5° F. by shock chilling.

A copolymer from vinyl stearate and allyl laurate in a ratio of 1 to 0.86 gave pour points of −10° F. at 0.5% and 0.1% in Oil I, of +10° F. at 0.1% in Oil II, and of +5° F. at 0.5% in Oil III. A copolymer from vinyl stearate and allyl laurate in a ratio of 1 to 2.41 gave pour points of −15° F. at 0.5% in Oil I and of +10° F. at 0.1% in Oil II. In Oil III at 0.5% the pour point by shock chilling was −15° F. A vinyl stearate-allyl laurate copolymer from the monomers in a 1 to 5.17 mole ratio gave pour points at 0.5% of −20° F., and at 0.1% of −10° F. in Oil I. In Oil III at 0.5% the pour point by shock chilling was −10° F. All of the above copolymers had a definite effect on Oil II even at 0.04%. But a similar copolymer from vinyl stearate and allyl laurate in a mole ratio of 1 to 12 had no effect, yet it depressed the pour point of Oils I and III. This particular combination does not have the sharp upper limit exhibited by copolymers based on lower allyl carboxylates.

A copolymer from vinyl palmitate and methallyl laurate in a 1 to 2.05 molar ratio gave pour points of −20° F. at 0.5% to 0.1% in Oil I. In Oil III at 0.5% it gave a pour point by shock chilling of −20° F. and by maximum pour points of −15° F. These data illustrate that this type of copolymer maintains a depressed pour point during severe temperature cycles, showing no significant pour point reversion. It should be further pointed out that neither polyvinyl palmitate nor polymethallyl laurate as an individual polymer or in a mechanical mixture exhibits any pour point depression.

A vinyl tetracosanate-allyl laurate copolymer in a 1:1 mole ratio at 0.5% in Oil I gave a pour point of −5° F. and in Oil II of +5° F. at 0.1%.

A copolymer prepared from 35 parts by weight of vinyl stearate and 65 parts of methallyl laurate (a 1:2.27 mole ratio) was dissolved in Oil I. At 0.25% it depressed the pour point to −25° C. and at 0.1% to −10° F. In Oil III at 0.5% it depressed the pour point to −20° F. under shock chilling and gave a pour point of −15° F. by the maximum pour test method. Individual polymers were prepared from the same vinyl stearate and methallyl laurate. Neither polymer depressed the pour point of oils. A mechanical mixture of the individual polymers in a 1:2.27 mole ratio likewise failed to depress the pour point.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as antioxidants, oiliness agents, detergents, and the like.

We claim:

A copolymer from vinyl stearate and allyl laurate, the proportion of allyl laurate groups therein being from 0.5 to 10 per vinyl stearate group.

LA VERNE N. BAUER.
WILLIAM L. VAN HORNE.
HARRY T. NEHER.

REFERENCES CITED

The following references are of record in the file of this patent:

UNITED STATES PATENTS

| Number | Name | Date |
|---|---|---|
| 2,263,598 | Starck et al. | Nov. 25, 1941 |
| 2,332,896 | D'Alelio | Oct. 26, 1943 |
| 2,424,838 | Moffett | July 29, 1947 |
| 2,441,023 | Larsen | May 4, 1948 |

FOREIGN PATENTS

| Number | Country | Date |
|---|---|---|
| 395,478 | Great Britain | July 20, 1933 |

OTHER REFERENCES

"Allyl Alcohol" by Shell Devel. 1946, p. 27 pertinent.